United States Patent
Meyer et al.

(10) Patent No.: US 9,567,229 B2
(45) Date of Patent: Feb. 14, 2017

(54) FUMED SILICA

(71) Applicants: Jürgen Meyer, Stockstadt (DE); Mario Scholz, Gründau (DE); Matthias Rochnia, Ortenberg-Bleichenbach (DE)

(72) Inventors: Jürgen Meyer, Stockstadt (DE); Mario Scholz, Gründau (DE); Matthias Rochnia, Ortenberg-Bleichenbach (DE)

(73) Assignee: EVONIK DEGUSSA GMBH, Essen (DE)

(*) Notice: Subject to any disclaimer, the term of this patent is extended or adjusted under 35 U.S.C. 154(b) by 33 days.

(21) Appl. No.: 14/184,401

(22) Filed: Feb. 19, 2014

(65) Prior Publication Data

US 2014/0171578 A1    Jun. 19, 2014

Related U.S. Application Data

(63) Continuation of application No. 12/095,840, filed as application No. PCT/EP2006/068889 on Nov. 24, 2006, now abandoned.

(30) Foreign Application Priority Data

Dec. 20, 2005  (EP) .................................... 05112533

(51) Int. Cl.
*C01B 33/12* (2006.01)
*B82Y 30/00* (2011.01)
(Continued)

(52) U.S. Cl.
CPC ................ *C01B 33/12* (2013.01); *B82Y 30/00* (2013.01); *C01B 33/183* (2013.01); *C08K 3/36* (2013.01); *C01P 2004/52* (2013.01); *C01P 2004/64* (2013.01); *C01P 2006/12* (2013.01); *Y10T 428/268* (2015.01); *Y10T 428/2982* (2015.01)

(58) Field of Classification Search
CPC ............. C01B 33/12; C08K 3/36; C09C 1/30; C09D 7/12
See application file for complete search history.

(56) References Cited

U.S. PATENT DOCUMENTS

| 4,760,123 A | 7/1988 | Imai et al. |
| 6,268,300 B1 | 7/2001 | Hernandez et al. |

(Continued)

FOREIGN PATENT DOCUMENTS

| EP | 0076377 B1 | 6/1985 |
| JP | 6-27267 A | 4/1994 |

(Continued)

OTHER PUBLICATIONS

Japanese Office Action issued on Aug. 4, 2011 for Application No. 2008-546330 (in English language).

(Continued)

*Primary Examiner* — Ling Choi
*Assistant Examiner* — Lanee Reuther
(74) *Attorney, Agent, or Firm* — Smith, Gambrell & Russell, LLP (57) ABSTRACT

Fumed silica having a BET surface area of 200±15 m2/g, a grindometer value of less than 30 μm and a median value by PCS of 65 to 85 nm is prepared by grinding a fumed silica having a surface area of 200±25 m2/g, and silicone rubber containing this silica.

6 Claims, 4 Drawing Sheets (51) Int. Cl.
*C01B 33/18* (2006.01)
*C08K 3/36* (2006.01)

(56) References Cited

U.S. PATENT DOCUMENTS

| | | | |
|---|---|---|---|
| 7,811,540 B2 * | 10/2010 | Adams | C09C 1/3081 106/490 |
| 2002/0166524 A1 | 11/2002 | Kerner et al. | |
| 2003/0195290 A1 | 10/2003 | Scholz et al. | |
| 2004/0110077 A1 | 6/2004 | Yachi et al. | |
| 2004/0253164 A1 | 12/2004 | Mangold et al. | |
| 2005/0241531 A1 | 11/2005 | Meyer et al. | |

FOREIGN PATENT DOCUMENTS

| | | |
|---|---|---|
| JP | 7-165980 A | 6/1995 |
| JP | 2003-176123 A | 6/2003 |
| JP | 2003-253120 A | 9/2003 |
| JP | 2005-1990 A | 1/2005 |
| WO | WO 2004020531 A1 * | 3/2004 |

OTHER PUBLICATIONS

International Preliminary Report on Patentability for PCT/EP2006/068889 mailed Jun. 24, 2008.
International Search Report and Written Opinion for PCT/EP2006/068889 mailed Feb. 15, 2007.

* cited by examiner

FUMED SILICA

CROSS REFERENCE TO RELATED APPLICATION

This application is a continuation of Ser. No. 12/095,840 filed Jun. 2, 2008, which is a U.S. National Stage Filing of international No. PCT/EP2006/068889 filed Nov. 24, 2006, which claims priority from EP 051125334 filed Dec. 20, 2005, which all are being incorporated in their entirety herein by reference The invention relates to fumed silica, to a process for preparing it and to its use.

Fumed silica (pyrogenically prepared silicon dioxide) is known from Ullmanns Enzyklopädie der technischen Chemie, Volume 21, page 464 (1982).

It is prepared by burning a vaporizable silicon compound, such as silicon tetrachloride, for example, in a mixture with hydrogen and oxygen.

The comminution of materials to form coarse powders (50-500 µm), fine powders (5-50 µm) and even greater finenesses (less than 5 µm) is common and widespread practice. For all comminution tasks there is a multiplicity of technical and industrial equipment offered and operated, all adapted to the particular circumstances of the specific tasks. A good overview of the comminution problems and of the diverse machines is given in Ullmanns Enzyklopädie der technischen Chemie, 3rd Edition, Volume 1, pages 616 to 638. For fumed silica the average primary particle diameters are notably lower (5-50 nm) than can be obtained by mechanical comminution.

The primary particles and aggregates of the fumed silica with a surface area of 200 m$^2$/g can be visualized in the electron microscope.

The primary particles and aggregates of a fumed silica agglomerate to form larger assemblies whose size is generally in inverse proportion to the primary particle size or in proportion to the specific surface area. The agglomerate size also increases in line with the extent to which the fumed silica is compacted.

The binding forces holding these agglomerates together are relatively weak. Nevertheless, when these agglomerates are incorporated into and broken down in a liquid system for the purpose of homogeneous distribution of the primary particles and aggregates, or particles with a low degree of agglomeration, a certain shearing energy is required. Depending on the particular field of application, dispersing is carried out using any of a very wide variety of mixing devices, with determining factors for the selection being not only the viscosity and polarity of the system but also the agglomerate strength and the desired homogeneity.

With simple agitator mechanisms, such as paddle stirrers, it is usually not possible to carry out to satisfaction the direct incorporation of small amounts of silicas, especially not when the systems in question are of low viscosity. However, paint and varnish makers, and also those who carry out processing, have an interest in obtaining performance-optimum distribution of the silicas, which are used predominantly as thickeners and thixotropic agents, by means of very simple devices, with a very low energy input and in a very short time.

In the case of paddle-stirrer dispersing, the coarse silica agglomerates are not sufficiently comminuted and hence are able to make only a small contribution to raising viscosities and thixotropy. The data relate to a UP resin (unsaturated polyester resin) as dispersion medium.

Reducing the agglomerate size by dispersing outside a liquid system, in other words, in practice, in the air, or by grinding in the conventional sense, is possible only to a limited extent, since in the case of material with a given propensity to agglomerate the comminution is followed immediately by the re-establishment of the old agglomeration state. This effect comes about no later than after recompaction of the material which as a result of the mechanical intervention has undergone a high degree of loosening and which in this form is not amenable to dispatch and storage. The storage time as well would have the effect of renewed agglomerate enlargement.

A value taken as a dimensional number and evaluation variable for the stage of distribution of a dispersible silica and maximum agglomerate size of the dispersion (granularity) is the so-called grindometer value to DIN 53203.

A known procedure is to render fumed silica hydrophobic, to grind it in a pinned-disc mill and then to classify it (US 2004/0110077 A1). This known silica is used as an external additive in toner mixtures.

Hydrophilic fumed silica with a BET surface area possesses a grindometer value as determined in UP resin (unsaturated polyester resin Ludepal P6 from BASF, 2% dispersion) in accordance with the DIN specification, of 50 to 60.

If this fumed silica is also relatively highly compacted (100 to 120 g/l), the grindometer value as well is also significantly higher, specifically more than 100, whereby necessitating an additional, not inconsiderable energy as a thickener and thixotropic agent.

A known procedure is to grind a highly dispersed silica having a surface area of approximately 300 m$^2$/g in a pinned-disc mill.

The grindometer value achieved is initially, for the uncompacted silica, 25.

If this silica is compacted to 50 g/l, the grindometer value rises to 30, and in the case of further compaction to 75 g/l it rises to as far as about 40.

In the case of storage over a period of three months, the ground silica, not modified but compacted to 50 g/l, has a grindometer value of 50 to 60.

Reagglomeration can only be prevented in accordance with the prior art if the hydrophilic silica is mixed with 3% by weight of a hydrophobic silica and if this mixture is ground by means of an air-jet mill or a pinned-disc mill (EP 0 076 377 B1).

In this case, for a fumed silica having a BET surface area of 200 m$^2$/g, even after compaction to 73 or 107 g/l, a grindometer value of 35 is achieved.

For a fumed silica having a BET surface area of 300 m$^2$/g, the addition of hydrophobic silica prior to grinding produces a grindometer value of 10 for a tamped density of 28.1 g/l and of 15 to 20 for a tamped density of 50 g/l.

The known fumed silicas have the disadvantage that they contain an unwanted fraction of hydrophobic silica.

The invention provides a fumed silica which is characterized in that it has the following physicochemical data:

| | |
|---|---|
| BET surface area | 200 ± 15 m$^2$/g |
| Grindometer value | less than 30 µm |
| Median value | PCS 65 to 85 nm |

The invention further provides a process for preparing the silica of the invention which is characterized in that a fumed silica having a BET surface area of 200±25 m$^2$/g is ground.

In one preferred embodiment of the invention the grinding can take place by means of a pinned-disc mill or an air-jet mill.

The fumed silica can have an average primary particle size of 12 nm±5 nm, preferably 12 nm.

In a further embodiment of the invention a fumed silica can be used which has a tamped density of approximately 50±10 g/l, preferably 50 m²/g.

In one particular embodiment of the invention a fumed silica can be used which has the following physicochemical data:

|  |  | AEROSIL ® 200 |
|---|---|---|
| Attitude to water |  | hydrophilic |
| Appearance |  | white powder |
| BET surface area[1] | m²/g | 200 ± 25 |
| Average primary particle size | mm | 12 |
| Tamped density[2] | g/l | about 50 |
| Less on drying[3] (2 h at 105° C.) on leaving supply plant | % | <=1.5 |
| Loss on ignition[4)5] (2 h at 1000° C.) | % | <=1 |
| pH[6] (in 4% aqueous dispersion) |  | 3.7-4.7 |
| $SiO_2$[7] | % | >=99.8 |
| $Al_2O_3$[7] | % | <=0.05 |
| $Fe_2O_3$[7] | % | <=0.003 |
| $TiO_2$[7] | % | <=0.03 |
| HCl[7)8] | % | <=0.025 |

[1] To DIN ISO 9277
[2] To DIN EN ISO 787-11, JIS K 5101/20 (unsieved)
[3] To DIN EN ISO 787-2, ASTM D 280, JIS K 5101/23
[4] To DIN EN 3262-20, ASTM D 1208, JIS K 5101/24
[5] Based on the substance dried at 105° C. for 2 hours
[6] To DIN EN ISO 787-9, ASTM D 1208, JIS K 5101/26
[7] Based on the substance calcined at 1000° C. for 2 hours
[8] HCl content in constituent from loss on ignition The Aerosil® 200 silica used in accordance with the invention, with a BET surface area, differs from the known Aerosil® 300, which has a surface area of 300 m²/g, not only in the surface size but also in the average primary particle size. The Aerosil® 300 has an average primary particle size of 7 nm. On the basis of these differences these silicas have different performance properties.

The fumed silica of the invention contains no hydrophobic fractions. In spite of this the silica of the invention shows no propensity to reagglomerate. The grindometer value is below 30.

The fumed silica of the invention can be used as a filler in silicone rubber compounds.

Silicone rubber compounds and the use of fumed silica (AEROSIL®) in silicone rubber compounds are known (Ullmann's Encyclopaedia of Industrial Chemistry, Volume A 23, Rubber, 1, 221 ff.; Rubber 3, 3.6 ff.; Volume A 24, Silicones 57 ff. 1993).

Fumed silica is used on account of its excellent thickening effect (thixotroping) in silicone sealants, this thickening effect being desirable in the context of use as a jointing compound.

Where, however, the silicone rubber compounds are to be used as coating materials, a low level of thickening is desired (U.S. Pat. No. 6,268,300).

Of decisive importance in both cases is the optical quality of the surface of the silicone vulcanizates. It is an object of the present invention, therefore, to provide silicone rubber compounds which through the use of fumed silica as filler exhibit an optically high-grade surface after vulcanization.

The invention provides silicone rubber compounds containing 0.5% to 60% by weight, based on the total mass, of the fumed silica of the invention having the following characteristic physicochemical data:

| BET surface area | 200 ± 15 m²/g |
|---|---|
| Grindometer value | less than 30 |
| Median value by PCS | 65 to 85 nm | and

40% to 99.5% by weight, based on the total mass, of an organopolysiloxane of the formula $Z_nSiR_{3-n}$—O—$[SiR_2O]_x$—$SiR_{3-n}$—$Z'_n$ where R=alkenyl, alkoxy, aryl, oxime, acetoxy, alkyl radicals, having 1 to 50 carbon atoms, unsubstituted or substituted by O, S, F, Cl, Br, I, in each case identical or different, and/or polystyrene, polyvinyl acetate, polyacrylate, polymethacrylate and polyacrylonitrile radicals having 40-10 000 repeater units.

Z=OH, Cl, Br, acetoxy, amino, amineoxy, oxime, alkoxyamido, alkenyloxy, acryloxy or phosphate radicals, it being possible for the organic radicals to carry up to 20 carbon atoms, and in each case identical or different.

Z'=oxime, alkoxy, acetoxy, amino, amido, n=1-3 x=100-15 000.

As organopolysiloxane it is possible to use all polysiloxanes which have or have been able to be used to date as a basis for room-temperature-crosslinking (room-temperature-vulcanizing) (RTV) compositions. They may be described for example by the general formula $Z_nSiR_{3-n}$—O—$[SiR_2O]_x$—$SiR_{3-n}$—$Z'_n$ where x, R, Z' and Z have the following definitions:

where R=alkenyl, alkoxy, aryl, oxime, acetoxy, alkyl radicals, having 1 to 50 carbon atoms, unsubstituted or substituted by O, S, F, Cl, Br, I, in each case identical or different, and/or polystyrene, polyvinyl acetate, polyacrylate, polymethacrylate and polyacrylonitrile radicals having 40-10 000 repeater units.

Z=OH, Cl, Br, acetoxy, amino, amineoxy, oxime, alkoxyamido, alkenyloxy, acryloxy or phosphate radicals, it being possible for the organic radicals to carry up to 20 carbon atoms, and in each case identical or different.

Z=oxime, alkoxy, acetoxy, amino, amido, n=1-3 x=100-15 000.

Within and/or along the siloxane chain in the formula indicated above it is also possible for there to be other siloxane units present, usually only as impurities, in the form of diorganosiloxane units, for example those of the formula $RSiO_{3/2}$, $R_3O_{1/2}$ and $SiO_{4/2}$, R in each case having the definition indicated for it above. The amount of these other siloxane units ought not to exceed 10 mol percent.

Examples of R with the definition alkyl radical are, for example, methyl, ethyl, propyl, hexyl and octyl radicals; possible alkenyl radicals are vinyl, allyl, ethylallyl and butadienyl radicals; and as aryl radicals it is possible to use phenyl and tolyl radical.

Examples of substituted hydrocarbon radicals R are in particular halogenated hydrocarbon radicals such as 3,3,3-trifluoropropyl radical, chlorophenyl and bromotolyl radical; and cyanoalkyl radicals, such as the β-cyanoethyl radical.

Examples of polymers as radical R are polystyrene, polyvinyl acetate, polyacrylate, polymethacrylate and polyacrylonitrile radicals which are attached to silicon via carbon.

On account of the greater ease of access the predominant fraction of the radicals R is composed of methyl groups. The other radicals R are, in particular, vinyl and/or phenyl groups.

Particularly in the case of the presence of formulations which are storable in the absence of water and which cure to elastomers at room temperature on ingress of water, Z and Z' are hydrolysable groups. Examples of such groups are acetoxy, amino, aminooxy, alkenyloxy (for example $H_2C=$ ($CH_3CO$—)), acyloxy and phosphate groups. Primarily on account of the greater ease of access, preferred groups Z are acyloxy groups, especially acetoxy groups. Excellent results, however, are also achieved using, for example, oxime groups, such as those of the formula —ON—C(CH$_3$) (C$_2$H$_5$), as Z. Examples of hydrolysable atoms Z are halogen and hydrogen atoms; examples of alkenyl groups Z are, in particular, vinyl groups.

The viscosity of the organopolysiloxanes used in the context of the invention ought not to exceed 500 000 cP at 25° C., preferably 150 000 cP at 25° C. Accordingly the value x ought preferably not to exceed 40 000.

Examples of organopolysiloxanes which can be used are, for example, the silicone polymers E50 (α,ω-hydroxydimethylsiloxypolydimethylsiloxane) or M50 (α,ω-hydroxydimethylsiloxypolydimethylsiloxane) from GE Bayer Silicones.

Mixtures of different organopolysiloxanes can also be used.

The mixing of these organopolysiloxanes with the fumed silica and, where appropriate, with the further constituents of the formulation of the invention can take place in any desired known way, for example in mechanical mixing devices. It is accomplished very rapidly and easily, irrespective of the sequence in which the mixing constituents are added.

Preferably the fumed silicas of the invention are used in amounts of 0.5% to 60% by weight, preferably 3% to 30% by weight, based on the total weight of the compounds which can be cured to elastomers.

If the only reactive terminal units present in the diorganopolysiloxanes which contain reactive terminal units are those having Si-bonded hydroxyl groups, then these diorganopolysiloxanes must be crosslinked. This can be done in a conventional way by means of the water present in the air, with the addition where appropriate of further water, with a crosslinking agent. Here it is possible for example to use the Silopren crosslinker 3034 from GE Bayer Silicones, the ethyltriacetoxysilane optionally in the presence of a condensation catalyst in a known way. Suitable catalysts for all formulations of the invention are, for example, the Silopren catalysts DBTA or type 162 dibutyltin diacetate or dilaurate from the same manufacturer.

In one particular variant of the silicone rubber compounds of the invention it is possible additionally for there to be 0.5%-20%, preferably 2%-10% by weight, based on the total weight of the compound, of a crosslinker having the formula with R=alkyl, alkoxy, acetoxy, oxime, aryl, alkene radicals, having 1 to 50 carbon atoms, unsubstituted or substituted by O, S, F, Cl, Br, I, in each case identical or different, and/or polystyrene, polyvinyl acetate, polyacrylate, polymethacrylate and polyacrylonitrile radicals having 5-5000 repeater units, Z'=OH, Cl, Br, acetoxy, oxime, amino, aminooxy, alkenyloxy or phosphate radicals, it being possible for the organic radicals to carry up to 20 carbon atoms, in each case identical or different, and t=3 or 4.

All weight data relate to the total amount of silicone rubber compounds.

Examples of silanes of the formula indicated above are ethyltriacetoxysilane, methyltriacetoxysilane, isopropyltriacetoxysilane, isopropoxytriacetoxysilane, vinyltriacetoxysilane, methyltrisdiethylaminooxysilane, methyltris(cyclohexylamino)silane, methyltris(diethylphosphato)silane and methyltris(methylethylketoximo)silane.

Of course it is possible for formulations of the invention to contain, besides organopolysiloxanes, hydrophobicized silica, crosslinking agents and crosslinking catalysts, if desired, fillers which are conventionally used mostly or frequently in compounds which can be cured to elastomers. Examples of such substances are fillers having a surface area below 50 m$^2$/g, such as coarse quartz powder, kaolin, phyllosilicates, clay minerals, diatomaceous earth, additionally zirconium silicate and calcium carbonate, and also untreated pyrogenically produced silicon dioxide, organic resins, such as polyvinyl chloride powders, organopolysiloxane resins, fibrous fillers, such as asbestos, glass fibres and organic pigments, soluble dyes, fragrances, corrosion inhibitors, curing retardants, such as benzotriazole, and plasticizers, such as dimethylpolysiloxanes end-blocked by trimethylsiloxy groups.

Optionally the RTV 1K [one-component] silicone rubber compounds of the invention can contain 0.1%-20%, preferably 0.1%-15%, with particular preference 0.1%-10% by weight (based on the total amount of the formulation (of water-binding substances). Suitable substances for this purpose are, for example, carboxylic anhydrides, for example acetic anhydride or maleic anhydride, and/or carbonic esters, such as for example diethyl carbonate, ethyl carbonate and/or alkenyloxy compounds and/or ketals, such as dimethyldioxolane, for example. It is possible to use one or more of these substances.

Additionally the silicone rubber compounds may contain 0.01% to 99.5% by weight of an unfunctionalized polysiloxane. Here it is possible to use the polysiloxanes already specified, provided that they are not functionalized. One suitable, non-functional polysiloxane is, for example, Baysilone oil M1000 (polydimethylsiloxane) from GE Bayer Silicones.

Additionally the silicone rubber compounds may contain 0.01% to 6% by weight of organic or inorganic compounds of the metals Pt, Sn, Ti and/or Zn as catalyst and/or 0.01% to 6% by weight of inhibitors and/or 0.01%-6% by weight of fungicides and/or bactericides and/or 0.01% to 6% by weight of adhesion promoters (such as, for example, Silopren adhesion promoter 3001 from GE Bayer Silicones, with the composition: di-tert-butoxydiacetoxysilane). As fungicides/bactericides it is possible for example to use isothiazolinone, Vinycin or benzisothiazolinone.

The silicone rubber compounds of the invention can be used as silicone rubber systems from the group of the room-temperature-vulcanizing one-component (1K RTV) silicone rubber sealants and also self-levelling roomtemperature-crosslinking silicone rubber compounds (1K RTV).

The silicone rubber compounds can be used as jointing compounds, window sealants, seals in motor vehicles, sports equipment and household appliances, heatresistant seals, oil-exuding and chemical-resistant seals, and water-vapour-resistant seals, and seals in electrical and electronic appliances.

The silicone rubber compounds can be used as coating materials for textiles, e.g. lace tape (antislip), and textile materials, e.g. woven glass fabric or woven nylon fabric.

The vulcanizates of the silicone rubber compounds of the invention advantageously have a high-grade surface.

EXAMPLES

I. Preparation of the Inventive Fumed Silica

The inventive examples were produced by metering commercial AEROSIL® 200 (bagged product) into the mill employed, using a metering balance, and subjecting it to grinding. The Aerosil® 200 has the physicochemical properties listed in Table 1.

The experiments were carried out using a pinned-disc mill (Alpine 160Z, rotor diameter 160 mm) or an air-jet mill (grinding chamber diameter: 240 mm, grinding chamber height: 35 mm). The individual parameters of preparation are listed in Table 2.

The ground product was isolated with a hose filter (filter area: 3.6 m$^2$, filter material: woven nylon fabric). In further experiments the ground product obtained was packaged into commercially customary bags using a commercially customary bagging machine.

In further experiments the bags packed with ground products were levelled prior to palletization, using a method routine in the industry and suitable for their purpose.

TABLE 2

Preparation of the inventive silica

| Designation | Mill* | GA** quantity [m$^3$] | GA** pressure [bar] | IA*** quantity [m$^3$] | IA*** pressure [bar] | Metering [kg/h] | Bagging | Levelling |
|---|---|---|---|---|---|---|---|---|
| Example 1 | AJ | 11.8 | 1.0 | 6.8 | 1.2 | 10 | no | no |
| Example 2 | AJ | 11.8 | 1.0 | 6.8 | 1.2 | 10 | yes | no |
| Example 3 | AJ | 11.8 | 1.0 | 6.8 | 1.2 | 10 | yes | yes |
| Example 4 | AJ | 27.3 | 3.5 | 15.8 | 3.7 | 10 | no | no |
| Example 5 | AJ | 27.3 | 3.5 | 15.8 | 3.7 | 10 | yes | no |
| Example 6 | AJ | 27.3 | 3.5 | 15.8 | 3.7 | 10 | yes | yes |
| Example 7 | PD | — | — | — | — | 10 | no | no |
| Example 8 | PD | — | — | — | — | 10 | yes | no |
| Example 9 | PD | — | — | — | — | 10 | yes | yes |
| Example 10 | PD | — | — | — | — | 20 | no | no |
| Example 11 | PD | — | — | — | — | 20 | yes | no |

AJ* = Air-jet mill
PD = Pinned-disc mill
GA** = Grinding air
IA*** = Injector air

TABLE 1

Fumed silica employed

| | | AEROSIL ® 200 |
|---|---|---|
| Attitude to water | | hydrophilic |
| Appearance | | white powder |
| BET surface area[1] | m$^2$/g | 200 ± 25 |
| Average primary particle size | nm | 12 |
| Tamped density[2] | g/l | about 50 |
| Loss on drying[3] (2 h at 105° C.) on leaving supply plant | % | <=1.5 |
| Loss on ignition[4][5] (2 h at 1000° C.) | % | <=1 |
| pH[6] (in 4% aqueous dispersion) | | 3.7-4.7 |
| SiO$_2$[7] | % | >=99.8 |
| Al$_2$O$_3$[7] | % | <=0.05 |
| Fe$_2$O$_3$[7] | % | <=0.003 |
| TiO$_2$[7] | % | <=0.03 |
| HCl[7][8] | % | <=0.025 |

[1] To DIN ISO 9277
[2] To DIN EN ISO 787-11, JIS K 5101/20 (unsieved)
[3] To DIN EN ISO 787-2, ASTM D 280, JIS K 5101/23
[4] To DIN EN 3262-20, ASTM D 1208, JIS K 5101/24
[5] Based on the substance dried at 105° C. for 2 hours
[6] To DIN EN ISO 787-9, ASTM D 1208, JIS K 5101/26
[7] Based on the substance calcined at 1000° C. for 2 hours
[8] HCl content in constituent from loss on ignition

TABLE 3

Physicochemical data of the inventively prepared silicas

| Designation | BET specific surface area [m$^2$/g] | pH | Tamped density [g/l] | Grindometer value [µm] | Median value by PCS [nm] |
|---|---|---|---|---|---|
| Comparative Example 1 | 197 | 4.1 | 46 | 40 | 86 |
| Example 1 | 197 | 4.1 | 24 | 25 | 74 |
| Example 2 | 198 | 4.1 | 48 | 25 | 65 |
| Example 3 | 199 | 4.1 | 62 | 30 | 72 |
| Example 4 | 200 | 4.1 | 22 | 23 | 68 |
| Example 5 | 200 | 4.1 | 41 | <20 | 73 |
| Example 6 | 199 | 4.1 | 63 | 25 | 75 |
| Example 7 | 197 | 4.1 | 21 | 30 | 73 |
| Example 8 | 198 | 4.1 | 47 | 20 | 65 |
| Example 9 | 198 | 4.2 | 52 | 20 | 71 |
| Example 10 | 199 | 4.1 | 18 | 25 | 75 |
| Example 11 | 198 | 4.1 | 49 | 25 | 65 |

With virtually the same specific surface areas in the range from 195 to 202 m$^2$/g, preferably from 198 to 200 m$^2$/g, and unchanged pH values, the silicas of the invention exhibit lower grindometer values and smaller median values than the starting silica.

Surprisingly the lower grindometer values and lower median values are retained in spite of the compaction, evident through the tamped density, as a result of bagging or bagging/levelling.

In some cases the tamped densities are in fact above that of the oxide used. This means that the oxides of the invention, despite the same or even higher compaction, exhibit lower grindometer values and lower median values.

TABLE 4

Particle size determination by evaluation of TEM micrographs

| Designation | DN [nm] | DA [nm] | DV [nm] | D50 (N) [nm] | D50 (g) [nm] | Total span [nm] |
|---|---|---|---|---|---|---|
| Comparative example | 13.838 | 17.513 | 22.372 | 13.043 | 15.010 | 6.180-45.740 |
| Example 1 | 11.528 | 12.536 | 13.086 | 11.013 | 12.473 | 5.260-25.500 |
| Example 4 | 12.467 | 13.436 | 13.873 | 12.302 | 13.278 | 5.260-22.740 |
| Example 5 | 13.517 | 17.150 | 21.747 | 13.111 | 14.713 | 6.180-45.740 |
| Example 8 | 12.551 | 14.147 | 15.429 | 11.684 | 13.173 | 6.180-34.700 |
| Example 9 | 12.503 | 20.450 | 28.401 | 11.195 | 35.586 | 5.260-45.740 |
| Example 10 | 13.240 | 14.242 | 14.990 | 12.565 | 13.657 | 7.100-42.060 |

DN = Particle diameter, arithmetic mean
DA = Particle diameter, averaged over surface area
DV = Particle diameter, averaged over volume
D50 (N) = Median value, number distribution
D50 (g) = Median value, weight distribution The inventive fumed silica can have a D50 (g) (i.e. median value, weight distribution) of 12 to 14 nm, preferably of 12.473 to 13.278 nm. The total span of the particles can be from 5.260 to 34.700 nm, preferably 5.260 to 22.740 nm.

Figure 1:
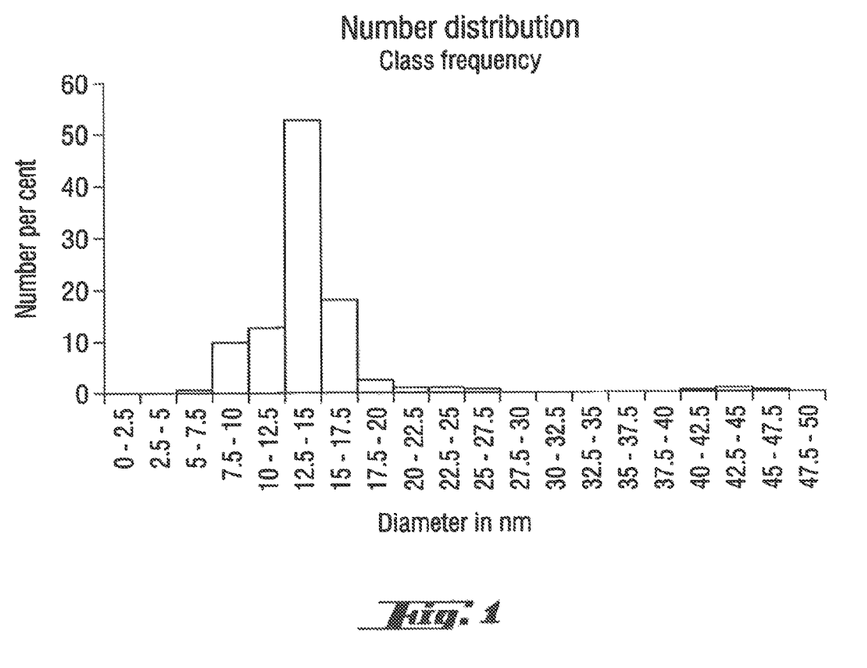
Figure 2:
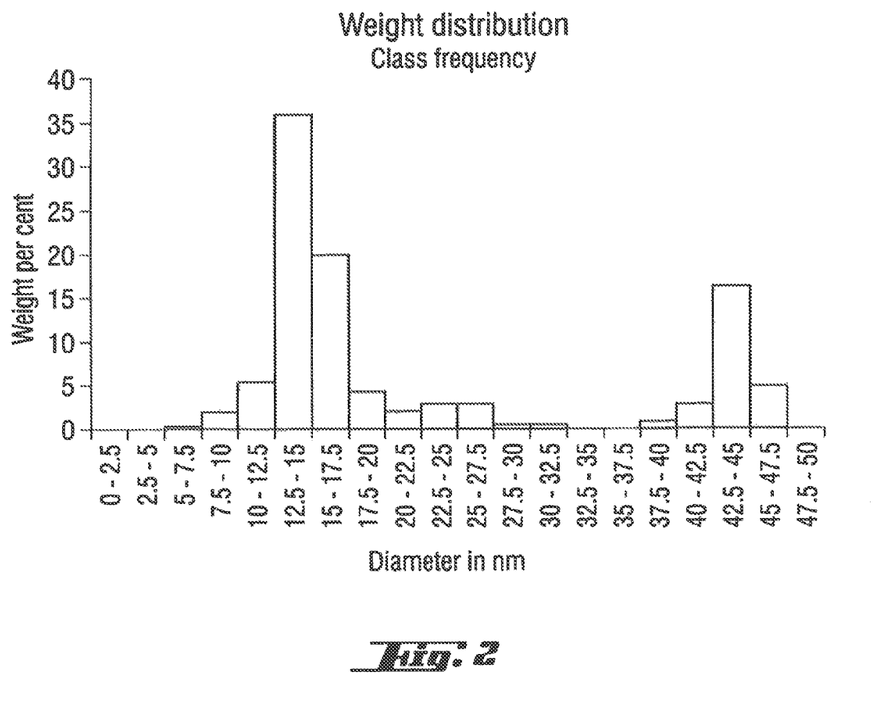
Figure 3:
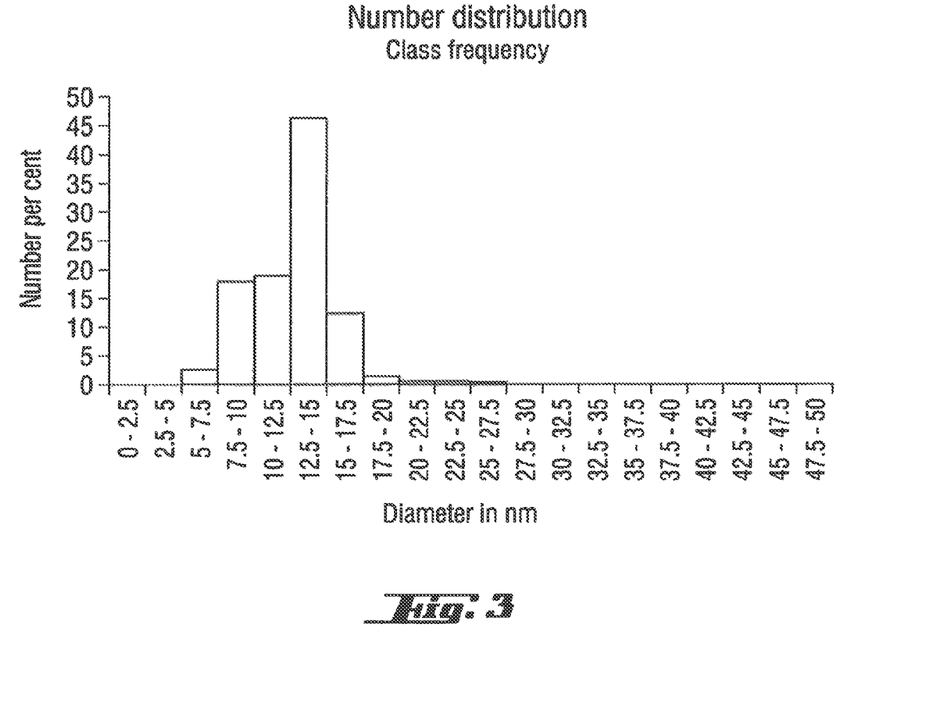
Figure 4:
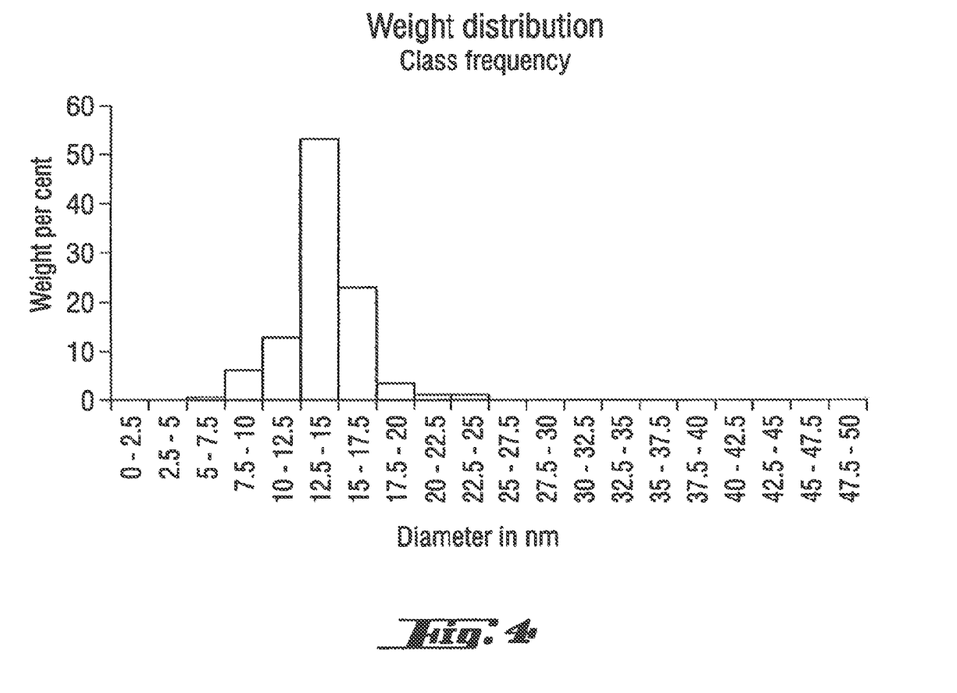

FIGS. 1 to 4 show that the inventive silica has no particles in the range greater than 40 nm when the weight distribution is considered (cf. FIG. 4).

The arithmetic mean of the particle diameter, DN, can be from 11.5 to 13.5 nm for the inventive silica.

The particle diameter averaged over the surface area, DA, can be 12.5 to 17.2 nm.

The particle diameter averaged over the volume, DV, can be 13.0 to 21.7 nm.

The median value D50 (A) (number distribution) can be 11.0 to 11.7 nm.

Determination of Characteristic Physicochemical Data
BET Surface Area

The BET surface area is determined in accordance with DIN ISO 9277.

Tamped Density

The tamped density is determined in accordance with DIN EN ISO 787-11.

Principles of Tamped Density Determination:

The tamped density (formerly tamped volume) is equal to the ratio of the mass to the volume of the powder after tamping in a tamping volumeter under defined conditions. According to DIN EN ISO 787-11 the tamped density is reported in g/cm³. Owing to the very low tamped density of the oxides, however, we state the value in g/l. Furthermore, the drying and sieving, and the repetition of the tamping process, are omitted.

Apparatus for Tamped Density Determination:
  Tamping volumeter
  Measuring cylinder
  Laboratory balance (reading accuracy 0.01 g)
Tamped Density Determination Procedure:
  200±10 ml of oxide are introduced into the measuring cylinder of the tamping volumeter so that there are no cavities remaining and so that the surface is horizontal.

The mass of the sample introduced is determined to an accuracy of 0.01 g. The measuring cylinder containing the sample is inserted into the cylinder holder of the tamping volumeter and tamped 1250 times.

The volume of the tamped oxide is read off to an accuracy of 1 ml.

Evaluation of Tamped Density Determination:

$$\text{Tamped density (g/l)} = \frac{\text{g initial mass} \times 1000}{\text{ml volume read off}}$$

pH

The pH is determined in 4% aqueous dispersion.
Reagents for pH Determination:
  Distilled or deionized water, pH>5.5
  Buffer solutions pH 7.00 pH 4.66
Apparatus for pH Determination:
  Laboratory balance (reading accuracy 0.1 g)
  Glass beaker, 250 ml
  Magnetic stirrer
  Magnetic rod, length 4 cm
  Combined pH electrode
  pH meter
  Dispensette, 100 ml
Procedure for Determining pH:

The determination takes place in a modification of DIN/ISO 787/IX.

Calibration:

Prior to pH measurement the meter is calibrated using the buffer solutions. Where two or more measurements are carried out one after another, a single calibration is sufficient.

4 g of oxide are mixed in a 250 ml glass beaker with 96 g (96 ml) of water, with the aid of a dispensette, and the mixture is stirred using a magnetic stirrer (speed about 1000 min$^{-1}$) for five minutes with the pH electrode immersed.

After the stirrer has been switched off the pH is read off after a standing time of one minute. The result is reported to one decimal place.

Grindometer Value
Principles:

The degree of dispersion determines the performance properties of the liquid thickened with Aerosil. The measurement of the grindometer value serves to assess the degree of dispersion. By the grindometer value is meant the boundary layer thickness below which the particles or aggregates present become visible on the surface of the sample which has been coated out.

The sample is coated out in a groove with a scraper, the depth of the groove at one end being twice the size of the diameter of the largest Aerosil particles, and decreasing steadily down to 0 at the other end. On a scale indicating the depth of the groove, the depth value is read off, in micrometers, the value in question being that below which a relatively large number of Aerosil particles becomes visible as a result of bits or scratches on the surface of the binder system. The value read off is the grindometer value of the system present.

Apparatus and Reagents:

Hegmann grindometer with a depth range of 100-0 micrometer.

Polyester resin dispersion with 2% Aerosil, prepared according to Testing Instructions 0380.

Procedure:

The grindometer block is placed on a flat, slip-proof surface and is wiped clean immediately prior to testing. The Aerosil dispersion, which must be free from air bubbles, is then applied to the deepest point of the groove in such a way that it flows off somewhat over the edge of the groove. The scraper is then held by both hands and placed, perpendicularly to the grindometer block and at right angles to its longitudinal edges, with gentle pressure, onto the end of the groove in which the dispersion is located. The dispersion is then coated out in the groove by slow, uniform drawing of the scraper over the block. The grindometer value is read off no later than 3 seconds after the dispersion has been coated out.

The surface of the spread dispersion (transverse to the groove) is viewed obliquely from above at an angle of 20-30° (to the surface). The block is held to the light in such a way that the surface structure of the spread dispersion is readily apparent.

The grindometer value read off on the scale is the value in micrometers below which a relatively large number of Aerosil particles become visible as bits or scratches on the surface. Individual bits or scratches occurring randomly are not taken into account in this context.

The granularity is assessed at least twice, in each case on a newly spread dispersion.

Evaluation:

From the measured values the arithmetic mean is formed. The relationship between the grindometer value in micrometers and the FSPT units and Hegmann units, which are based on the inch system, is as follows:

$$B=8-0.079A$$

$$C=10-0.098A=1.25B$$

In this Relationship:
A=Grindometer value in micrometers
B=Grindometer value in Hegmann units
C=Grindometer value in FSPT units Particle Size Determination by Means of PCS Purpose:

The method of analysis described below is used to determine the particle size distribution by means of photon correlation spectroscopy (PCS, dynamic light scattering) of the dispersed phase (mostly solid particles) in dispersions. This method is particularly suitable for determining particles and their aggregates whose size lies within the submicrometer range (10 nm to 3 μm).

General Remarks, Theory:

The basis for particle size determination by means of PCS is the Stokes-Einstein equation, which demonstrates the relationship between particle size (expressed through the so-called hydrodynamic diameter d(H)) and the diffusion coefficient D of the particles:

$$d(H)=kT/3\eta \cdot \Pi D$$

Clearly this equation can be derived via an equilibrium of forces between the Brownian motion of the particles and the opposing flow resistance. From this equation it is also comfortably apparent which parameters must be known or constant: the viscosity η of the dispersing medium, and the temperature T. If this is ensured, the hydrodynamic diameter can be calculated via the determination of the diffusion coefficient. Expressed in other terms: large particles move slowly, small ones quickly.

The movement of the particles in a dispersion can be monitored via the fluctuation in the scattered-light intensity of a laser beam. Where rapid movements are present, the fluctuation in intensity is small; slower particles generate more considerable fluctuations. By way of mathematical operations such as a Fourier transformation or an autocorrelation function, it is possible, from the fluctuation pattern of the scattered-light signal, which is constant on average, to infer a particle distribution.

In the simplest case, a monodisperse distribution is assumed. If the logarithm of the autocorrelation function is then plotted against the correlation time, the average diffusion constant is given by the slope of the best-fit line. This form of evaluation is known as "cumulant analysis". In reality this relationship is usually non-linear, since the distributions present are not actually monodisperse. As a measure of the breadth of distribution the polydispersity index "PI" is defined, by adapting a third-degree polynomial rather than a straight line. The "PI" is then PI=2c/b2 where b and c are the coefficients of second and third degree.

In order to determine volume-weighted or mass-weighted averages, however, it is necessary to consider the Mie theory (comprehensive scattered-light theory), which presupposes a knowledge of the refractive indices of particle and dispersion medium. In order to gain even more information from the intensity fluctuations, it is possible mathematically to adapt distributions other than, for example, one (or more) log-normal distribution(s). An established method of achieving this is the so-called "Contin" analysis, which encompasses lopsided and also multimodal distributions.

Since the definition of the hydrodynamic diameter derives from the assumption of spherical form of the particles, the measurement result obtained must always be understood, in the case of non-spherical particles, as an equivalent spherical diameter. This means that the diameter assumed is that of a sphere which causes the same intensity fluctuations as the non-spherical particles under determination. Only indirectly, therefore, does the hydrodynamic diameter have anything to do with an "actual size".

Measurement Prerequisites, Restrictions:

The structure of the scattered-light geometry of different instruments gives rise to technical restrictions on the measurement. The conventional PCS instrument, such as the Malvern Zetasizer 3000 instrument used here, uses a scattered-light angle of 90°. In order to rule out multiple scattering, which would falsify the result, the sample under measurement must with this geometry be highly diluted. Indicative values are a concentration of 0.001%-0.01% by weight. Obviously the dispersions under measurement ought to be translucent and to have only a slight turbidity. Other geometries also permit the use of higher concentrations. Hence depending on particle type (particle density, morphology) it is possible to carry out measurement even of concentrations from 0.5% to 30% by weight. For this purposes, for example, the Horiba LB 500 instrument uses a back-scattering optical system for which the ratio between single and multiple scattering is virtually constant and can therefore be disregarded. In the case of the alternative 3D cross-correlation technique it is possible to eliminate the fraction of multiply scattered light mathematically through the use of two independent laser beams. Where high concentrations are used, however, there is a further restriction to be observed: the determination of the diffusion constant presupposes the free mobility of the particles, which at high concentrations is no longer the case. For this reason, with instruments which allow the use of higher concentrations, dilution series ought to be routinely measured.

Determining the Particle Size Distribution by Means of PCS Requires Knowledge of the Following Physical Parameters:

Temperature of the Dispersion

In the case of the Zetasizer 3000 the sample holder is thermally conditioned by way of a Peltier element (25° C.), and the temperature is held constant during the measurement. This is important in order to rule out convection movement within the cell, which would superimpose itself on the free movement of the particles. The Horiba LB500 measures the temperature in the cell and takes account of the temperature it measures in the context of the evaluation.

Viscosity of the Dispersion Medium

In the case of the highly diluted systems this is not critical, since in that case the viscosities of the pure solvents at 25° C., for example, are well known. It is necessary, however, to ensure that the right viscosity is used for the calculation.

Refractive Index of Particles and Dispersion Medium

These figures are needed only for the volume-weighted evaluation. For determining a cumulant analysis (zave, PI) these details are unimportant. For standard systems there are tabular values (see instrument handbook); in the case for example of surface-modified substances, however, one ought to be aware of this possible source of error if the refractive index is not known with precision, and in that case only the cumulant analysis ought to be used.

Furthermore, the following preconditions must be met:

The dispersion must be stable to sedimentation. Sedimentation in the cell not only generates additional movement in the particles (see above) but also alters the scattered-light intensity during measurement. Moreover, it depletes the dispersion of larger particles, which collect on the bottom of the cell. For this reason the scattered-light intensity should be monitored during the measurement ("count rate"). If this count rate is not stable, the result ought not to be interpreted. This restriction is the reason why the upper measurement limit for PCS is dependent on the difference in density between particle and dispersion medium.

To dilute the dispersion to measurement concentration it is necessary to use extremely clean, dust-free solvent (generally water). This is particularly important for the measurement of small particles and also in highly dilute dispersions.

Instruments:

Malvern Zetasizer 3000 HSa instrument

Disposable cells 10×10×48 mm (e.g. Sarstedt Ref. 67.754) for aqueous dispersions or glass cells 10×10×48 mm for solvent-containing dispersions.

Glass beaker

Syringe (20 ml)

Disposable filter 200 µm (for example Macherey-Nagel Chromafil A-20/25, cellulose mixed ester)

Disposable pipette

Software, settings

The Malvern Zetasizer 3000 HSa instrument is controlled via a computer program which also carries out the evaluation of the measurement signal and allows the results to be archived and printed out. As regards the operation of the program, refer to the handbook.

Prior to each measurement it is necessary to perform the following settings within the software:

Input of the refractive indices of particle and medium (see above)

Input of the viscosity of the dispersion medium (see above)

Designation and notes relating to the sample

Path and file for archiving of the result

In addition the following settings are present as standard and are generally not changed:

10 measurements are collated to form one series and their average is expressed as the result.

3 such measurements are carried out per sample.

There is a waiting time of 1 minute before each measurement (for constant temperature).

Attenuator "Auto" (instrument automatically attenuates the signal intensity down to a factor of 128, so that it is not necessary to prepare the sample with such precision).

Data Analysis "Contin"

Other settings: dilation 1.20; weighting "quadratic"; size range "Auto"; point select "Auto", by cut off 0.01; optical properties 0.00, core real 1.6, core imag. 0; Mark-Houwink parameters A 0.5 cm2/s, K 0.000138.

Procedure:

Sample Preparation:

20 ml of pure solvent (generally fully demineralized water) are filtered, using a syringe, through a 200 µm filter and then introduced into a clean, dust-free glass beaker. If the dispersion under measurement has been made acidic or basic, demineralized water adjusted accordingly is used, in order to prevent a pH shock when the dispersion is diluted. Then one drop of the dispersion is added, using a disposable pipette, to the solvent, and the glass beaker is swirled gently for some time until the drop has dispersed homogeneously, and a slight turbid solution has formed. This solution is introduced using a second disposable pipette into the cell, which is sealed and fixed in the instrument's cell holder.

Instrument Preparation

The instrument and also the attached computer are switched on and the associated measurement program is started. After the instrument has been switched on it is necessary to wait a while, since laser and Peltier element must first come up to operating temperature. Generally, therefore, the instrument is switched off only in cases of prolonged standstill (several days).

Measurement and Evaluation:

At the beginning of the measurement it is necessary first of all to input the sample parameters and sample designation and also to select the file in which the measurements are to be stored. The actual measurements are started by clicking on the "Go" button. The results of the three measurements are subsequently compared. When there is a good match one of the measurements is selected and represented as a volume-weighted distribution by selection of the menu item "View->New plot->Volume". Selecting "Copy->Table as Text" transfers the result via the Clipboard to Excel, where it is converted, using a macro, into a report file (XLS). The Excel file generated in this way is stored on the server.

If the values of the individual measurements do not match, a repeat measurement is carried out. If it is apparent that during the measurements there are sharp fluctuations in the count rate occurring, the result is not evaluated and the particle size measurement is carried out, where appropriate, by a different method.

II. Silicone Rubber Compounds

Examples 13 to 16

The experiments for determining the surface properties of silicone vulcanizates were carried out in a speed mixer, with the following formulation:

| | | | |
|---|---|---|---|
| 62% | Polymer E 50 | 31.0 g | 15 s |
| 25% | Oil M 1000 | 12.5 g | 2500 min$^{-1}$ |
| 1% | Carbon black | 0.5 g | |
| 4% | Crosslinker | 2.0 g | 15 s |
| | | | 2500 min$^{-1}$ |
| 8% | Silica | 4.0 g | 2 × 30 s |
| | | | 500 min$^{-1}$ |

| | | |
|---|---|---|
| 1 drop | Dibutyltin dilaurate | 2 × 60 s<br>2500 min$^{-1}$ |

A polyethylene beaker which can be screwed closed with a lid is charged with 31 g (62%) of α,ω-hydroxydimethylsiloxypolydimethylsiloxane (E 50, GE Bayer Silicones). Subsequently 12.5 g (25%) of α,ω-trimethylsiloxypolydimethylsiloxane (M1000, GE Bayer Silicones) are added. After addition of 0.5 g (1%) of carbon black (Printex 3, Degussa AG) the mixture is mixed in the speed mixer at 2500 rpm for 15 seconds.

Then 2.0 g (4%) of ethyltriacetoxysilane (AC 3034, GE Bayer Silicones) are added to this mixture and the components are mixed in the speed mixer at 2500 rpm for 15 seconds. Subsequently 4.0 g (8%) of fumed silica are mixed in at 2500 rpm within 30 seconds or in two steps (2×15 seconds) in the speed mixer. Material clinging to the inner wall is stripped off and the batch is again mixed at 2500 rpm for 30 seconds. Addition of 1 drop (0.01%) of dibutyltin dilaurate is followed by speed mixer mixing at 2500 rpm for 120 seconds. The silicone formulation obtained in this way is coated with a coating bar and vulcanized at room temperature in ambient air over a period of 24 hours. The surface of the vulcanizates is inspected and evaluated on a school-grade system:

Grades: 1=very good, 2=good, 3=satisfactory, 4=unsatisfactory, 5=deficient

Grade 1 is awarded when the vulcanizate has no defects or undispersed particles.

For grade 2 there are only a very few defects visible.

In the case of grade 3 there are somewhat more.

In the case of grade 4 the number of visible defects is such that the surface appearance would be unacceptable for technical use.

The same applies to a grading of 5, only more so.

When the inventive silicas are used in accordance with Examples 3, 6 and 9, surprisingly, the silicone vulcanizates have good surface properties in comparison to the standard material.

The silicone vulcanizate with the standard material shows only an unsatisfactory surface, which is also hardly surprising, since silicas of high surface area cannot generally be used in silicone sealants, for precisely that reason.

TABLE 5

Experiments 13-16

| Expt. No. | Oxide | Yield point [Pa] | Viscosity D = 10 s−1 [Pa*s] | Surface [grades] |
|---|---|---|---|---|
| 13 | Comparative example | 521 | 158 | 4.0 |
| 14 | Example 3 | 475 | 141 | 2.0 |
| 15 | Example 6 | 411 | 120 | 2.0 |
| 16 | Example 9 | 438 | 146 | 2.5 |

The invention claimed is:

1. Hydrophilic milled fumed silica prepared by a process having no propensity to reagglomerate, comprising grinding fumed silica having a BET surface area of 200±25 m$^2$/g and recovering a hydrophilic milled fumed silica that exhibits lower grindometer values and smaller median values than the starting fumed silica, wherein the hydrophilic milled fumed silica contains no hydrophobic fractions and has the following physicochemical data:

| | |
|---|---|
| BET surface area | 200 ± 15 m$^2$/g |
| Grindometer value | less than 30 μm |
| Median value by PCS | 65 to 85 nm |
| D50 | 12 to 14 weight distribution |
| Particle size span | 5.260 to 34.70 nm |
| Particle size mean | 11.5 to 13.5 nm. |

2. A composition comprising silicone rubber and the hydrophilic milled fumed silica according to claim 1.

3. Silicone rubber composition comprising 0.5% to 60% by weight of the hydrophilic milled fumed silica according to claim 1.

4. The silicone rubber composition according to claim 3 which is vulcanized.

5. An article of manufacture made from the vulcanize silicone rubber composition of claim 4.

6. The hydrophilic milled fumed silica according to claim 1 which has no particles in the range greater than 40 μm.

* * * * *